United States Patent
Brandt et al.

(10) Patent No.: US 7,658,234 B2
(45) Date of Patent: Feb. 9, 2010

(54) RIPPER OPERATION USING FORCE VECTOR AND TRACK TYPE TRACTOR USING SAME

(75) Inventors: Everett G. Brandt, Brimfield, IL (US); Andrew G. Shull, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 11/299,066

(22) Filed: Dec. 9, 2005

(65) Prior Publication Data

US 2007/0131438 A1 Jun. 14, 2007

(51) Int. Cl.
*A01B 63/112* (2006.01)

(52) U.S. Cl. ......................................................... 172/7
(58) Field of Classification Search ............... 172/2, 172/4.5, 5, 9, 10, 12, 265, 7
See application file for complete search history.

(56) References Cited

U.S. PATENT DOCUMENTS

| | | | | |
|---|---|---|---|---|
| 1,501,652 A * | 7/1924 | Ferguson | | 172/239 |
| 1,864,639 A * | 6/1932 | Crezee | | 172/443 |
| 3,698,484 A * | 10/1972 | Kinnan | | 172/40 |
| 4,031,964 A * | 6/1977 | Takahashi et al. | | 172/9 |
| 4,044,838 A * | 8/1977 | Wooldridge | | 172/2 |
| 4,062,539 A * | 12/1977 | Tetsuka et al. | | 172/12 |
| 4,120,364 A * | 10/1978 | Wooldridge | | 172/2 |
| 4,300,638 A * | 11/1981 | Katayama et al. | | 172/10 |
| 4,454,919 A * | 6/1984 | Arnold et al. | | 172/1 |
| 4,518,044 A * | 5/1985 | Wiegardt et al. | | 172/7 |
| 4,834,461 A | 5/1989 | Fidler et al. | | |
| 4,900,093 A | 2/1990 | Krone et al. | | |
| 4,934,463 A * | 6/1990 | Ishida et al. | | 172/4.5 |
| 4,991,659 A | 2/1991 | Stepe et al. | | |
| 5,121,800 A * | 6/1992 | Gabriel | | 172/54 |
| 5,293,944 A * | 3/1994 | Matsumoto | | 172/2 |
| 5,528,843 A * | 6/1996 | Rocke | | 37/348 |
| 5,551,524 A | 9/1996 | Yamamoto et al. | | |
| 5,684,691 A * | 11/1997 | Orbach et al. | | 700/56 |
| 5,685,377 A * | 11/1997 | Arstein et al. | | 172/2 |
| 5,694,317 A | 12/1997 | Nakagami et al. | | |
| 5,697,454 A * | 12/1997 | Wilcox et al. | | 172/447 |
| 5,911,279 A | 6/1999 | Whitener | | |
| 5,974,352 A * | 10/1999 | Shull | | 701/50 |
| 6,205,687 B1 * | 3/2001 | Rocke | | 37/348 |
| 6,378,620 B1 * | 4/2002 | Luca et al. | | 172/4 |
| 6,385,519 B2 * | 5/2002 | Rocke | | 701/50 |
| 6,547,012 B2 * | 4/2003 | Scarlett et al. | | 172/1 |
| 2002/0195259 A1 * | 12/2002 | Satzler | | 172/705 |

FOREIGN PATENT DOCUMENTS

JP 4-277229 10/1992

\* cited by examiner

*Primary Examiner*—Robert E Pezzuto
*Assistant Examiner*—Matthew D Troutman
(74) *Attorney, Agent, or Firm*—Liell & McNeil

(57) ABSTRACT

A method of increasing efficiency and avoiding or reducing potential stall conditions is accomplished by configuring a ripper of a track type tractor responsive to a net force vector acting on the ripper. The net force vector is indicative of the various forces and pressures acting on the ripper, and the values indicative of these forces can be sensed. For instance, the force and value indicative of the force magnitude can be sensed by monitoring driveline torque, whereas the force vector angle can be derived from ripper tilt and lift actuator pressures. The ripper is configured responsive to the force vector magnitude and direction either via a control algorithm, or by inputs generated by an operator.

16 Claims, 4 Drawing Sheets

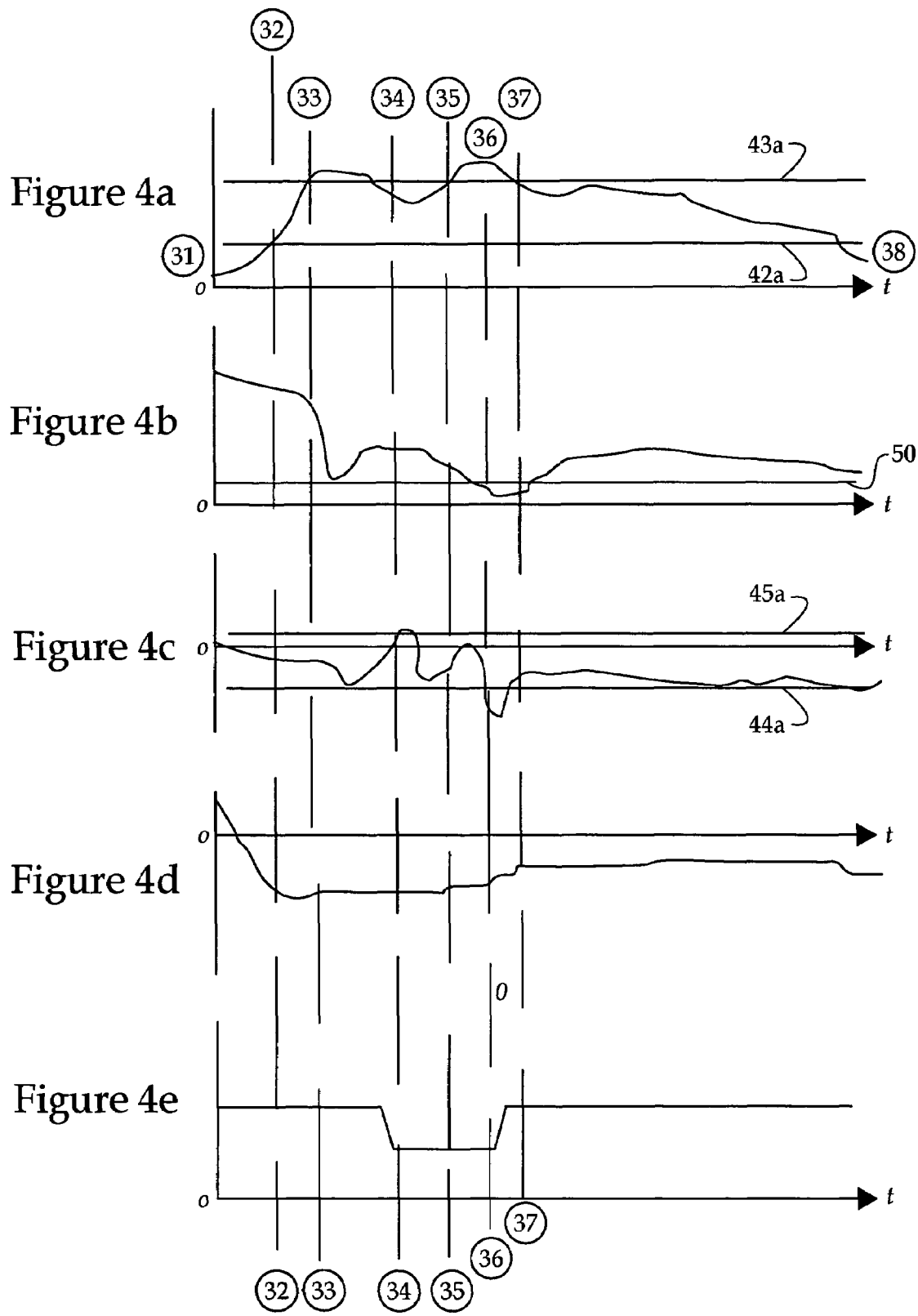

RIPPER OPERATION USING FORCE VECTOR AND TRACK TYPE TRACTOR USING SAME

TECHNICAL FIELD

The present disclosure relates generally to a control method for ripping mechanisms, and relates more particularly to configuring the ripper in response to a magnitude and direction of a net force vector on the ripper.

BACKGROUND

Ripping earth using large tracktype tractors has traditionally been a difficult and time consuming job, even for very skilled operators. Because the process necessarily involves unseen underground components, the ripper can encounter a very loose area of earth in which it could be moved relatively easily. Alternatively, the ripper could get caught up on underground obstacles, such as large boulders or bedrock, which pose the likelihood of increasing the drag on the machine, sometimes to the extent that the engine stalls and the tractor stops. When the engine stalls, the ripper generally has to be lifted from the earth and reset at a different point after reinitiating movement of the tractor, which can lead to costly losses of both time and fuel. A skilled operator can only prevent these inefficiencies to the degree that they become aware of a deceleration of the tractor prior to the engine stalling. This awareness usually requires a high degree of experience and familiarity with the machine and also a high degree of force on the machine before any outward signs are evidenced to the operator. However, in many instances, the operator has insufficient time to react by changing the ripper configuration to prevent a stall.

Work machine control strategies to increase efficiency are well known in the art. For instance, co-owned U.S. Pat. No. 5,974,352 is aimed at controlling operation of a bucket on a work machine to increase efficiency through the use of sensed force angles and magnitudes and altering the bucket position in response to the net force vector on the bucket. A net force vector on a loader bucket is determined based upon sensor inputs to an electronic controller. Bucket tilt and lift commands during contact with a pile of material are modified responsive to differences between the force vector and a target angle. However, this control strategy described generally for wheel loaders is not directly transferable to ripping operations that are based on much different considerations.

In another control example U.S. Pat. No. 4,062,539 teaches a method of automating control of a ripper in piercing and digging modes, respectively. This reference teaches movement of the ripper to a preset angle to initiate either a piercing or digging operation. This reference also teaches the concept of raising the ripper to avoid an overload condition, and re-lowering the ripper when the drag load decreases below some predetermined threshold. But this reference fails to recognize that vertical forces on the ripper and tilt control of the ripper might be exploited to achieve improved efficiencies.

The present disclosure is directed to one or more of the problems or shortcomings described above.

SUMMARY OF THE DISCLOSURE

In one aspect, a method of ripping earth includes the steps of moving a ripper through earth and sensing a plurality of values indicative of forces on the ripper. These values are then used to determine a force vector, which includes both a magnitude and direction based on the sensed values. Finally, the ripper is configured in response to the force vector.

In another aspect, a track type tractor includes a tractor chassis with a pair of movable tracks and a movable ripper. At least one ripper actuator is operably coupled between the ripper and the tractor chassis. An electronic controller is in communication with a sensor and in control communication with the ripper actuator(s). The electronic controller includes a ripper control algorithm operable to determine a force vector, which includes a magnitude and a direction, based on inputs from the at least one sensor, and is operable to configure the at least one ripper actuator(s) based on the force vector.

BRIEF DESCRIPTION OF THE DRAWINGS

FIG. 4 is a graph of ripping cycle variables versus time for a sample ripping operation according to the present disclosure wherein:

FIG. 4a is a graph of force vector magnitude from the sample ripping operation according to the present disclosure;

FIG. 4b is a graph of tractor speed for the sample ripping operation;

FIG. 4c is a graph of force angle for the sample ripping operation;

FIG. 4d is a graph of ripper lift actuator position for the sample ripping operation according to the present disclosure; and FIG. 4e is a graph of ripper tilt actuator position for the sample ripping operation according to the present disclosure.

DETAILED DESCRIPTION

Figure 1:
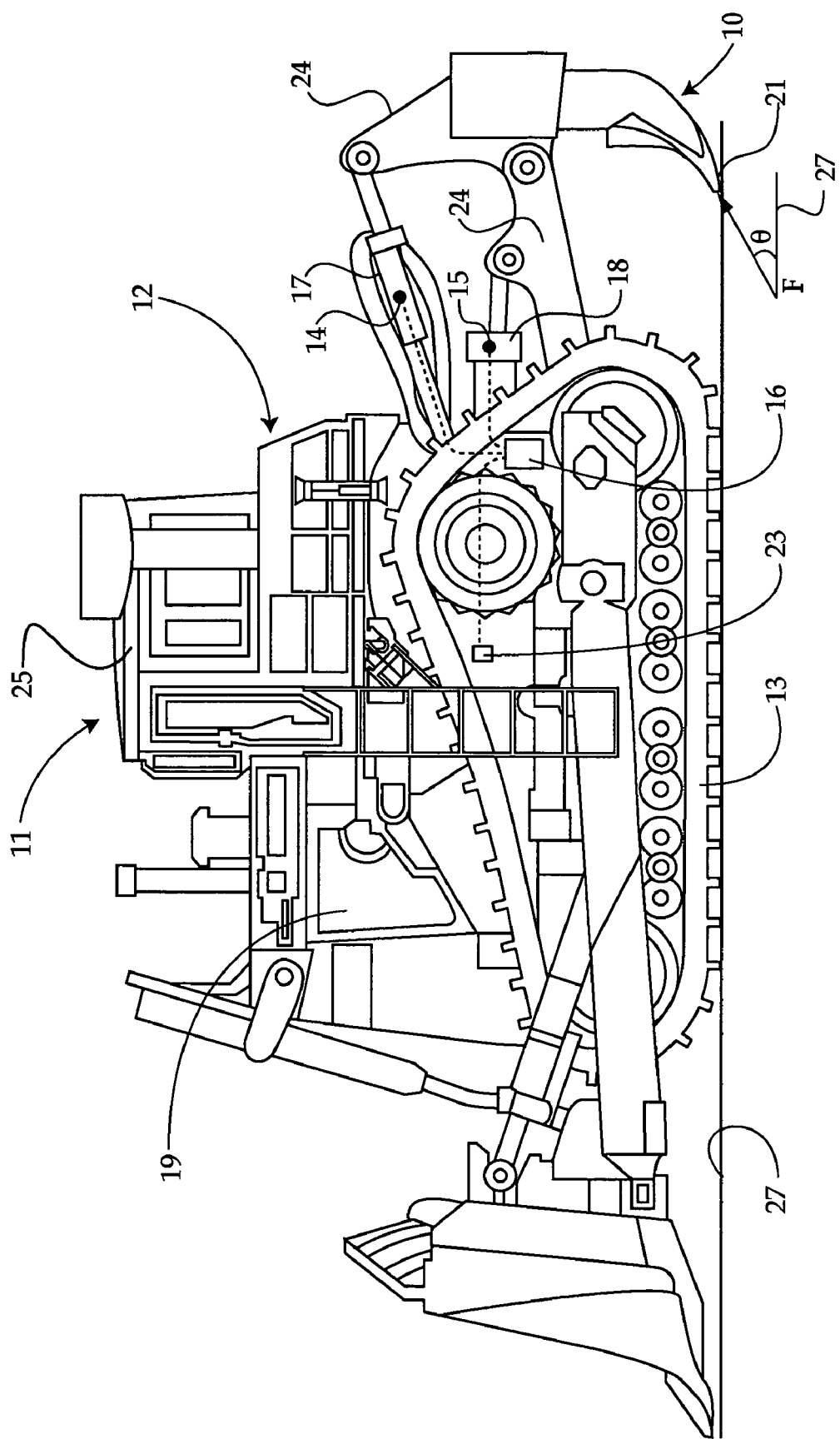
FIG. 1 is a diagrammatic side view of a track type tractor including a ripper according to the present disclosure.

Referring to FIG. 1, there is shown a track type tractor 11 including a chassis 12, a pair of movable tracks 13 powered by an engine 19, and a ripper 10 according to the present disclosure. The tractor 11 includes at least one sensor 14, 15 which is in communication with an electronic controller 16. The electronic controller 16 operably controls actuators, including but not limited to hydraulic cylinders 17, 18, which can change the ripper configuration by changing the angular orientation θ and lift position of the ripper 10. In particular, electronic controller 16 is in control communication with ripper lift actuator 18 and ripper tilt actuator 17. Actuator sensors 14 and 15 could include hydraulic pressure sensors, but might also include actuator position sensors. Those skilled in the art will recognize that forces on ripper 10 will be reflected by pressures in hydraulic actuators 17 and 18. In an alternative, forces on ripper 10 could also be determined via stress sensors associated with linkages 24 that facilitate positioning of ripper 10. Those skilled in the art will appreciate that during ripping operations, the forces on ripper 10 are primarily in a direction opposite to the travel direction of tractor 11. Thus, other means of determining the force magnitude, at least in the drag direction, could include monitoring driveline torque, and possibly even by monitoring tractor ground speed changes. Position sensors could allow the electronic controller 16 to determine the configuration (depth and orientation) of ripper 10. But actuator position sensors are not necessary to practice the ripper control of the present disclosure. A position sensor on the tilt actuator 17 might be useful to monitor proximity limits. This could avoid tilt commands beyond the actuator limits. Finally, the electronic controller 16 is in communication with a driveline torque sensor 23 of the track-type tractor 11. In practice, torque sensor 23 may include an engine speed sensor and a transmission speed sensor, whose inputs are ratioed by electronic controller 16 to arrive at a value indicative of engine torque in a conventional manner. Tractor 11 might also include a conventional sensor (not shown) for sensing ground speed, and may include other sensors known in the art. For instance, a chassis angle sensor (not shown) might also be included so that the electronic controller can compensate for uphill or downhill travel during ripping operations.

Hydraulic actuators 17 and 18 can be controlled via control signals sent from electronic controller 16. These control signals can be based upon manual commands from an operator in operator station 25 in a conventional manner, or may be generated by a ripper control algorithm that is part of electronic controller 16 during ripping operations. During a typical ripping operation, the tractor propulsion system, which includes engine 19, a transmission (not shown), and tracks 13, will be set to operate in a low speed and high torque condition. The operator will then lower ripper 10 into the ground to commence a ripping operation. As this occurs, various forces will be produced on ripper 10. The sum of these forces on ripper 10 can be represented by a net force vector F acting on the tip of ripper 10. In other words, all of the forces on ripper 10 can be approximated with a single force vector having a magnitude and direction θ with regard to tractor horizontal 27. Depending upon what the ripper 10 encounters, the net force vector F generally points away from tractor 11, but the angle θ will generally vary from the slightly positive to a moderate negative angle with regard to tractor horizontal line 27.

Experience has shown that a ripping operation can be made substantially efficient by maintaining the force vector above some minimum threshold that accomplishes significant rip while preventing the force magnitude from becoming so large as to stall engine 19 and stop the tractor 11. In addition, experience has shown that the efficiency of the ripping operation is best performed in a range of force vector angles that predominate with a slight negative angle with respect to tractor horizontal line 27. The ripper control algorithm of the present disclosure utilizes these insights in configuring the ripper 10 in response to both the angle θ and magnitude of the net force vector F on ripper 10. Although the magnitude and angle of force vector F are coupled, the present disclosure recognizes that the force magnitude is primarily a function of the ripper depth, while the force angle θ is primarily a function of the tilt orientation of ripper 10, which is determined by tilt actuator 17.

Figure 2:
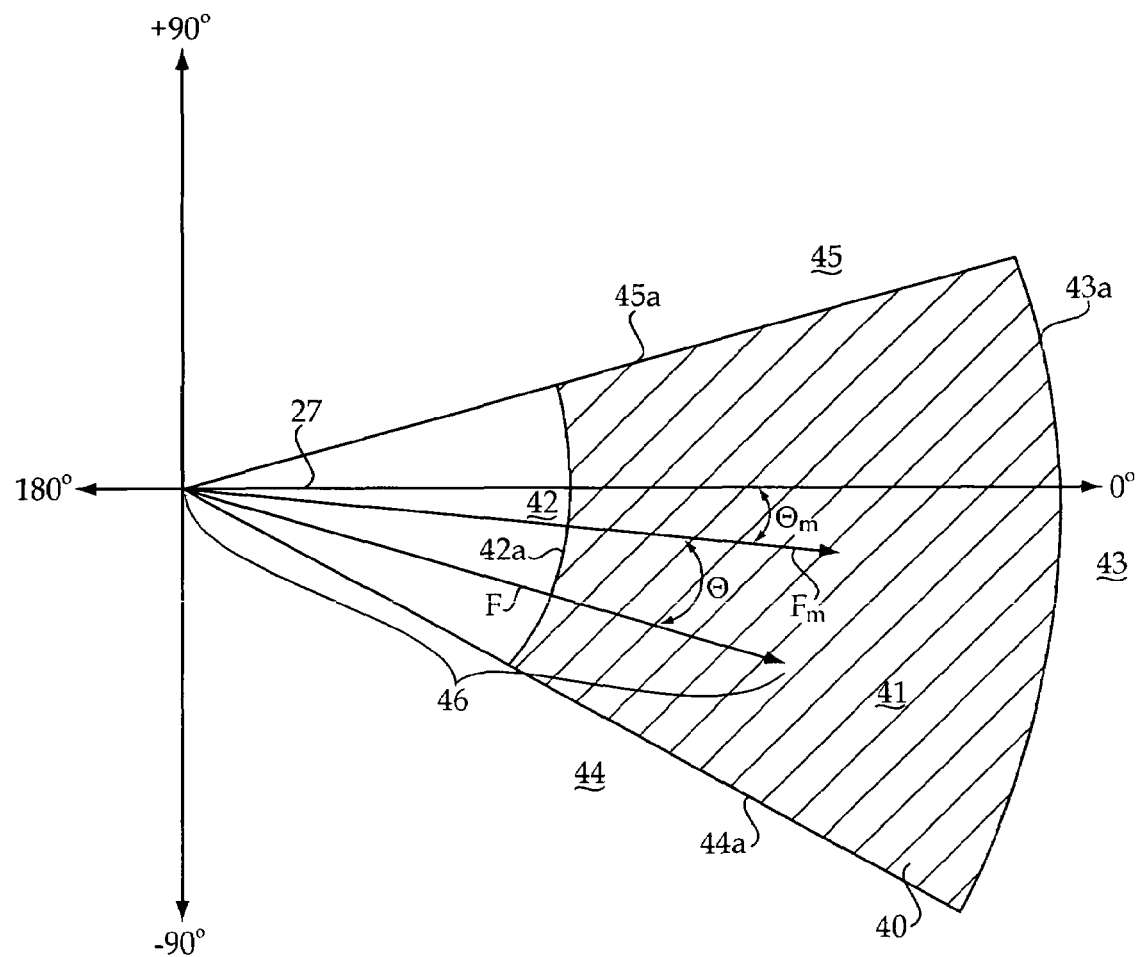
FIG. 2 is a polar plot diagram graphically showing desirable limits on a ripper force vector according to one aspect of the present disclosure.

Referring to FIG. 2, there is shown a polar plot diagram illustrating the force vector F on the ripper 10. The force vector F has both a force magnitude 46 and a force angle θ with respect to the tractor's horizontal line 27. In one embodiment, the ripper control algorithm generates control commands to actuators 17 and 18 to maintain the force vector F in the hatched region 40 shown in FIG. 2. Those skilled in the art will appreciate that this could be accomplished by continuously reconfiguring ripper 10 or by only triggering control responses when force vector F leaves region 40. In other words, the ripper control algorithm may or may not include responsive adjustments when the force vector is in region 40, but preferably produces increasing large responsive control inputs to hydraulic actuators 17 and 18 as the force vector approaches the boundary or moves out of the region 40 shown in FIG. 2. The present disclosure contemplates that the information on FIG. 2 may or may not be provided to the operator of tractor 11. If the force vector information is provided to the operator, the operator can respond in real time with control commands to perform the ripper control strategy of the present disclosure. On the other hand, if a ripper control algorithm is utilized, this information need not necessarily be provided to the operator, and the control algorithm itself will periodically or continuously reconfigure the ripper actuators 17 and 18 to maintain the net force vector F in the region 40.

The force magnitude 46 has an upper limit 43a and a lower limit 42a, while the force angle θ also has an upper limit 45a and a lower limit 44a. These upper and lower limits 42a, 43a, 44a and 45a would define a range 40 of operating force magnitudes and angles 41. Thus, a ripper control algorithm according to the present disclosure may be performed manually by an operator provided with force vector information, but is preferably performed via a stored ripper control algorithm in electronic controller 16 without operator input. In one specific embodiment, the electronic controller, and/or the operator, would do nothing as far as reconfiguring ripper 10 as long as force vector F stayed within the boundaries of region 40. However, if the force vector F drops too low into area 42 by passing below a minimum force magnitude lower limit 42a, the control algorithm would respond by lowering the ripper further into the earth. On the other hand, if the force vector becomes so large as to cross over the maximum force magnitude upper limit 43a and move into area 43, the ripper would be raised in order to reduce the force and bring the force vector back into region 40 before a stall condition might rise. This condition could be detected by deriving the magnitude of force vector F from sensors, 14 and 15; by detecting an increased driveline torque; by sensing a deceleration in tractor ground speed; or, by any combination or equivalent means known in the art. If the force vector angle θ becomes too large and begins to have a positive angle θ that crosses force angle upper limit 45a into area 45, the ripper control algorithm will respond by tilting the ripper forward (i.e. move ripper tip toward the tractor) and bring the force vector F back into region 40. On the other hand, if the force angle becomes increasingly negative and passes force angle lower limit 44a into area 44, the ripper control algorithm will respond by tilting the ripper actuator backward away from tractor 11. Those skilled in the art recognize that the sensors merely measure valves indicative of forces on ripper 10.

Although the region 40 may be preset and stored in the electronic controller 16, the present disclosure also contemplates this region being defined by an operator input, or possibly a stored region may be adjusted by operator inputs without departing from the scope of the present disclosure. The region 40 reflects a mean desired force vector $F_M$ having and angle $\theta_M$ that is slightly negative with respect to the horizontal, and reflects a force vector magnitude that allows the tractor to maintain good speed while retaining an adequate ripper penetration depth to perform substantial ripping operations.

Figure 3:
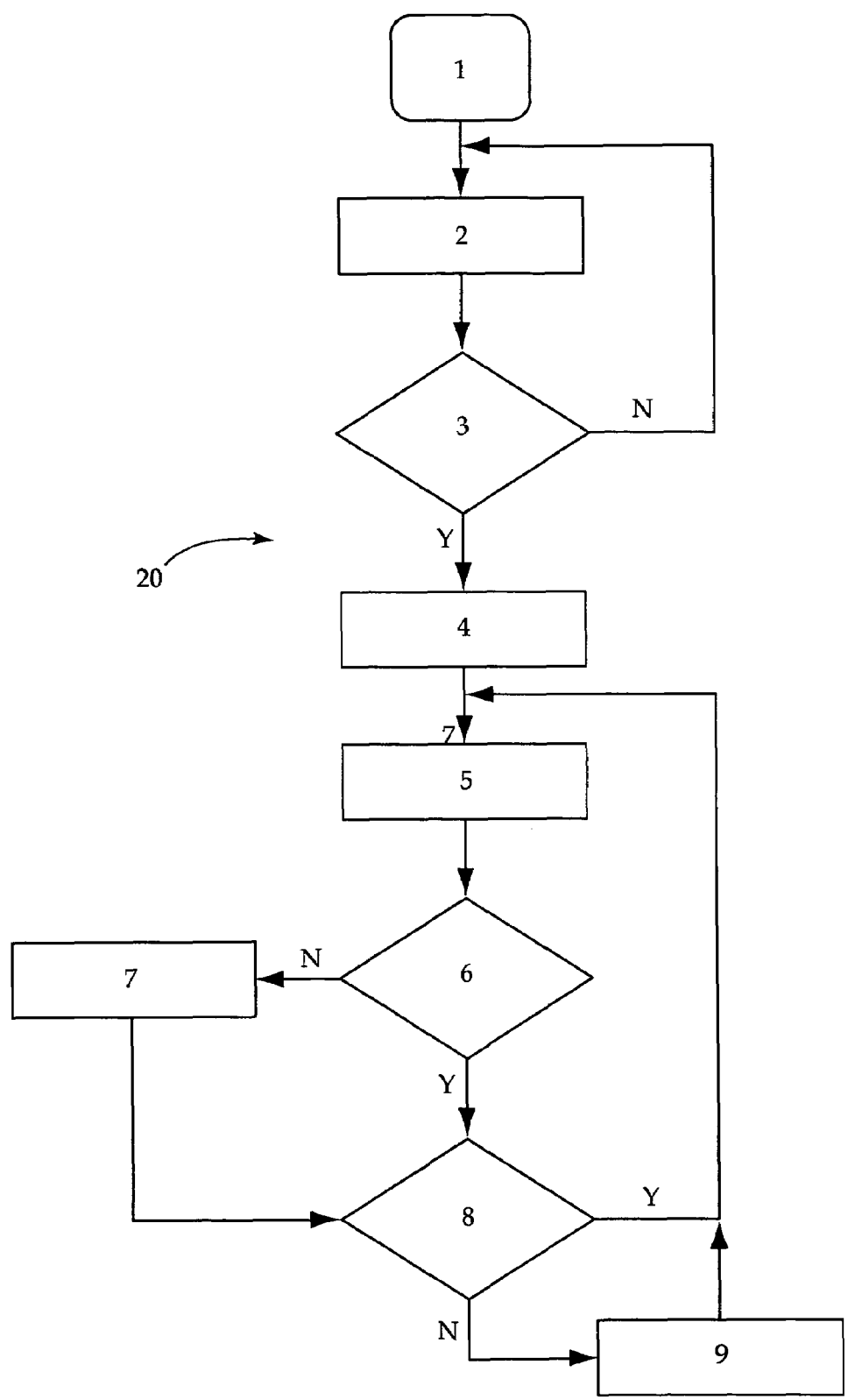
FIG. 3 is a control algorithm flow diagram according to the present disclosure.

Referring to FIG. 3 and with continued reference to FIGS. 1 and 2, there is shown a sample ripping control algorithm 20 which would be utilized by the electronic controller 16 to adjust the configuration of the ripper 10. The operator would engage the automatic ripping algorithm 20 which would start at box 1. The ripper would be lowered into the ground 2, either by operator control, or by a predetermined initiation algorithm available to electronic controller 16. The electronic controller 16 may monitor the driveline torque via sensor(s) 23 to see whether a minimum torque threshold had been reached at box 3, which would be a value indicative of a minimum force magnitude 42a being exceeded. Once force vector F had entered region 40, the closed loop control would be initiated at box 4. As the ripper 10 was being moved through the earth, the electronic controller 15 would monitor the force magnitude 46 of the force vector F. Those skilled in the art will appreciate that the net force vector F can be constructed or determined by sensing the respective hydraulic fluid pressures in actuators 17 and 18 via sensors 14 and 15. In other words, by knowing the geometry associated with ripper 10 and actuators 18, a net force vector diagram can be constructed to derive an approximate net force vector F acting on tip 21 of ripper 10 based upon the variety of forces and pressures acting on ripper 10 as reflected by the fluid pressures in actuators 17 and 18. In practice, the force angle θ may be derived from the pressures in actuators 17 and 18, and the force magnitude might be indicated by driveline torque alone or in combination with ground speed changes that are sensed. Thus, at box 5 the current data set is read by the electronic controller, which would include in this embodiment, the fluid pressures indicated by sensors 14 and 15, as well as the driveline torque indicated by sensor(s) 23. From this data, the ripper control algorithm may derive values indicative of the magnitude 46 and angle θ of the force vector F.

One skilled in the art will recognize that if the force magnitude is too large, this can create the risk of the engine stalling and tractor stopping. The magnitude of force vector F may be compared to region 40 at box 6. If the magnitude is outside of region 40, the control algorithm 20 would either raise the ripper 10 at least in part by contracting the ripper lift actuator 18 in order to decrease the force magnitude 46 if the force exceeds limit 43a, or lower the ripper 10 at least in part by expanding the ripper lift actuator 18 in order to increase the force magnitude 46 above the lower limit 42a at box 7. Those skilled in the art will appreciate that as an alternative to actually calculating the magnitude of a value indicative of the magnitude of force vector F, the control algorithm 20 may monitor tractor speed in a conventional manner and infer the force vector magnitude by detecting either an acceleration or deceleration of tractor 11 in a conventional manner. If the force vector magnitude is within acceptable limits, the control algorithm may advance to compare box 8. The algorithm 20 would then monitor the force vector angle θ to determine whether it was above or below the upper force angle limit 45a or the lower force angle limit 44a, respectively. If the force angle θ is outside the acceptable limits 44a, 45a then the electronic controller 15 will direct the ripper tilt actuator 17 to configure the ripper 10 to increase or decrease the force angle θ, respectively at box 9. If the force angle θ is determined to be within acceptable limits, no corrective action may be taken and the control algorithm will loop back to box 5 to again read the sensor inputs indicative of the forces acting on ripper 10.

Although the present disclosure describes this information as being determined via ripper actuator pressure sensors 14 and 15, as well as an driveline torque sensor(s) 23, those skilled in the art will appreciate that these force vector indicators can be determined in any conventional manner without departing from the present disclosure. For instance, the present disclosure contemplates the pressure sensors 14 and 15 as only being utilized by the control algorithm 20 to determine force vector angle, and the driveline torque sensor 23 as being the means of determining a value indicative of the force vector magnitude. Those skilled in the art will appreciate that other enhancements might include factoring in a determination of how much the ground over which the tractor is moving deviates from a level terrain in controlling the ripper. Also other known factors such as temperature or weather conditions may be used to arrive at a more sophisticated version of the present disclosure. Although the present disclosure contemplates that the ripper control algorithm could be exercised without operator input in a closed loop fashion, the present disclosure also contemplates active involvement by the operator by providing information associated with the ripper force vector F to the operator, and allowing the operator to make decisions to reconfigure the ripper 10 based on the force vector F. However, the former is preferred in order to avoid operator fatigue and to increase the response time of the system, since the electronic controller can respond quicker than a human being to changes occurring to the force vector F.

INDUSTRIAL APPLICABILITY

This disclosure contemplates the use of a control algorithm 20 that (FIG. 3) stored on electronic controller 16 in conjunction with a track-type tractor 11 including a ripper 10. It is contemplated that as the ripper 10 moves through the earth, it will encounter different obstacles which will act upon the ripper 10 with a force that can be sensed and approximated as a net force vector F acting on tip 21 of ripper 10. Thus, the present disclosure finds potential application to any ripping operation, and particularly those associated with track type tractors.

Referring now to FIG. 4, several ripping related values are indicated verses time for a segment of an example ripping operation according to the control algorithm illustrated in FIGS. 2 and 3. In particular, FIG. 4a-e show force vector magnitude, tractor speed, force angle θ, ripper lift actuator position and ripper tilt actuator position, respectively verses time for an example ripping operation. At time 31 the ripper begins descending into the ground and engages earth. This can be accomplished by operator input, or be performed according to some prestored algorithm. At time 32, a monitored driveline torque, and hence the force vector magnitude 46, has reached a minimum threshold 42a (FIG. 2), and the closed loop control algorithm is engaged as shown in step 4 of FIG. 3. The control algorithm 20 precedes to determine values indicative of the force vector magnitude 46 and angle θ at step 5 in FIG. 3. At time 33 in FIG. 4, the sensor 23 indicates that the driveline torque has exceeded a maximum threshold 43a, and the control algorithm responds by incrementally raising ripper 10 as shown in FIG. 4d causing the torque to move back below maximum 43a and return to hatched region 40 as shown in FIG. 2. FIG. 4b shows that the tractor speed responds to the high engine torque by quickly decelerating toward a minimum desired speed 50 in response to the high torque experienced after time 33. At time 34, the ripper force angle is detected as exceeding a maximum threshold 45a indicating a potentially large resistance on the ripper from the low side of the blade. The control algorithm 20 responds as shown in FIG. 4e by tilting the ripper 10 toward tractor 11. At time 35, driveline torque, and hence force vector magnitude again exceeds a maximum threshold, and FIG. 4b shows that the ripper is again raised to reduce the force magnitude into acceptable limits. At time 36, the force vector angle dips below a minimum threshold 44a, indicating a relatively large resistance from the high side of the blade. The control algorithm 20 responds by actuating tilt cylinder 17 to curl the ripper blade backward away from the tractor to "scoot under" the hard spot. At time 36, the tractor speed also dips below a predetermined desired threshold 50 indicating that a potential stall can be imminent. The control algorithm 20 responds by again incrementally lifting the ripper 10 at time 37 in order to bring the tractor speed up above minimum limit 50. The ripping operation then continues with little or no adjustment until time 38 is reached, when the force vector magnitude as reflected by driveline torque dips below a minimum threshold 42a, and the control algorithm 20 responds as shown in FIG. 4d by incrementally lowering the ripper into the ground until the force magnitude again exceeds the minimum value 42a.

Those skilled in the art will appreciate that ripping is generally only performed when ground conditions are too hard to proceed directly to dozing operations. When ripping is necessary, efficiency is highest if stalls can be avoided. Oftentimes an operator can not respond quickly enough to a resistance encountered by the ripper to reconfigure the ripper in time to avoid a stall. However, the control strategy of the present disclosure can monitor variables indicative of the forces acting on the ripper and can initiate corrective actions faster than what may be possible with a skilled operator. In other words, the operator must generally rely upon sensing deceleration of tractor 11 before taking corrective actions; however, the present disclosure allows the controller 16 to monitor forces that will reveal themselves before those forces cause significant deceleration of tractor 11 in the direction of a stall. Thus, not only can the electronic controller generally respond faster than the human being, but it also can sense a potential stall condition arising before a human being generally could. In addition, because the electronic controller with the ripper control algorithm according to the present disclosure allows the ripper operator to avoid continuously changing the ripper configuration and monitoring conditions closely, operator fatigue can be avoided while increasing the overall efficiency of the ripping operation by avoiding stalls and restarts, and the time in fuel associated therewith.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A method of ripping earth, comprising the steps of:
   providing a plurality of sensors to sense forces on a ripper;
   providing an electronic controller in communication with the sensors and programmed with a ripper control algorithm;
   moving the ripper through earth;
   sensing a plurality of values indicative of forces on the ripper;
   determining a force vector, which includes a magnitude and direction, based on the sensed values; and
   adjusting a configuration of the ripper with the control algorithm responsive to the force vector being outside of a force vector region bounded by predetermined upper and lower force vector magnitude and force vector angle limits, wherein adjusting the configuration of the ripper includes adjusting a tilt orientation of the ripper in response to the force vector being outside the force vector angle limits.

2. The method of claim 1, wherein the moving step includes the steps of:
   lowering the ripper into earth;
   pulling the ripper through earth with a track type tractor; and
   engaging the control algorithm.

3. The method of claim 2 wherein the sensing step includes the steps of:
   sensing a value indicative of pressure in a ripper lift actuator;
   sensing a value indicative of pressure in a ripper tilt actuator; and
   sensing a value indicative of driveline torque.

4. The method of claim 3, wherein the configuring step includes positioning a depth of the ripper with the ripper lift actuator responsive to the sensed driveline torque.

5. A method of ripping earth, comprising the steps of:
   providing a plurality of sensors to sense forces on a ripper;
   providing an electronic controller in communication with the sensors and programmed with a ripper control algorithm;
   moving the ripper through earth;
   sensing a plurality of values indicative of forces on the ripper;
   determining a force vector, which includes a magnitude and direction, based on the sensed values;
   configuring the ripper with the control algorithm responsive to the force vector;
   wherein the moving step includes the steps of:
      lowering the ripper into earth;
      pulling the ripper through earth with a track type tractor; and
      engaging the control algorithm;
   wherein the sensing step includes the steps of:
      sensing a value indicative of pressure in a ripper lift actuator;
      sensing a value indicative of pressure in a ripper tilt actuator; and
      sensing a value indicative of driveline torque;
   wherein the configuring step includes positioning a depth of the ripper with the ripper lift actuator responsive to the sensed driveline torque;
   wherein the configuring step includes a step of tilting the ripper responsive to the direction of the force vector, the tilting step including moving a tip of the ripper toward the track type tractor responsive to the direction of the force vector having an increasingly positive angle with respect to a tractor horizontal line, and moving a tip of the ripper away from the track type tractor responsive to the direction of the force vector having an increasingly negative angle with respect to the tractor horizontal line; and
   determining the direction of the force vector based on the sensed pressures in the ripper lift and tilt actuators.

6. The method of claim 5 wherein the configuring step includes a step of lowering the ripper responsive to the magnitude of the force vector becoming decreasingly small; and
   the configuring step includes a step of raising the ripper responsive to the magnitude of the force vector becoming increasingly large.

7. The method of claim 5, wherein the magnitude of the force vector is controlled toward a force magnitude range with a predetermined minimum and a predetermined maximum.

8. The method of claim 7 wherein the tilting step includes a step of controlling the direction toward an angular range with a mean that is a negative angle with respect to the tractor horizontal line.

9. A method of ripping earth, comprising the steps of:
   providing a plurality of sensors to sense forces on a ripper;
   providing an electronic controller in communication with the sensors and programmed with a ripper control algorithm;
   moving the ripper through earth;
   sensing a plurality of values indicative of forces on the ripper;

determining a force vector, which includes a magnitude and direction, based on the sensed values;

configuring the ripper with the control algorithm responsive to the force vector; and wherein the configuring step includes a step of tilting the ripper responsive to the direction of the force vector, the titling step including moving a tip of the ripper toward the track type tractor responsive to the direction of the force vector having an increasingly positive angle with respect to a tractor horizontal line, and moving a tip of the ripper away from the track type tractor responsive to the direction of the force vector having an increasingly negative angle with respect to the tractor horizontal line.

10. The method of claim 9, wherein the tilting step includes a step of controlling the direction toward an angular range with a mean that is a negative angle with respect to the tractor horizontal line.

11. The method of claim 10 wherein the magnitude of the force vector is controlled toward a force magnitude range with a predetermined minimum and a predetermined maximum.

12. A track type tractor comprising:

a tractor chassis;

a pair of movable tracks connected to the tractor chassis;

a movable ripper connected to the tractor chassis;

at least one ripper lift actuator and at least one tilt actuator operably coupled between the ripper and the tractor chassis;

a first sensor operably coupled to the ripper tilt actuator and a second sensor operably coupled to the ripper lift actuator;

an electronic controller in communication with the sensors and being in control communication with the ripper lift and tilt actuators, and including a ripper control algorithm operable to determine a force vector, which includes a magnitude and direction, based on inputs from the sensors, and being operable to configure the ripper lift and tilt actuators based on the force vector; and a force vector region bounded by predetermined upper and lower force vector magnitude and force vector angle limits recorded in the electronic controller, the control algorithm operable to configure the tilt actuator in response to the force vector being outside the force vector angle limits.

13. The track type tractor of claim 12 wherein the ripper tilt actuator includes a first hydraulic cylinder, and the first sensor includes a first pressure sensor; and the ripper lift actuator includes a second hydraulic cylinder, and the sensor includes a second pressure sensor.

14. The track type tractor of claim 13 including a torque sensor in communication with the electronic controller.

15. The track type tractor of claim 12 wherein the electronic controller includes means for comparing a determined force vector to the force vector region.

16. The track type tractor of claim 15 including means for reconfiguring the ripper responsive to the determined force vector being outside the force vector region.

* * * * *